UNITED STATES PATENT OFFICE.

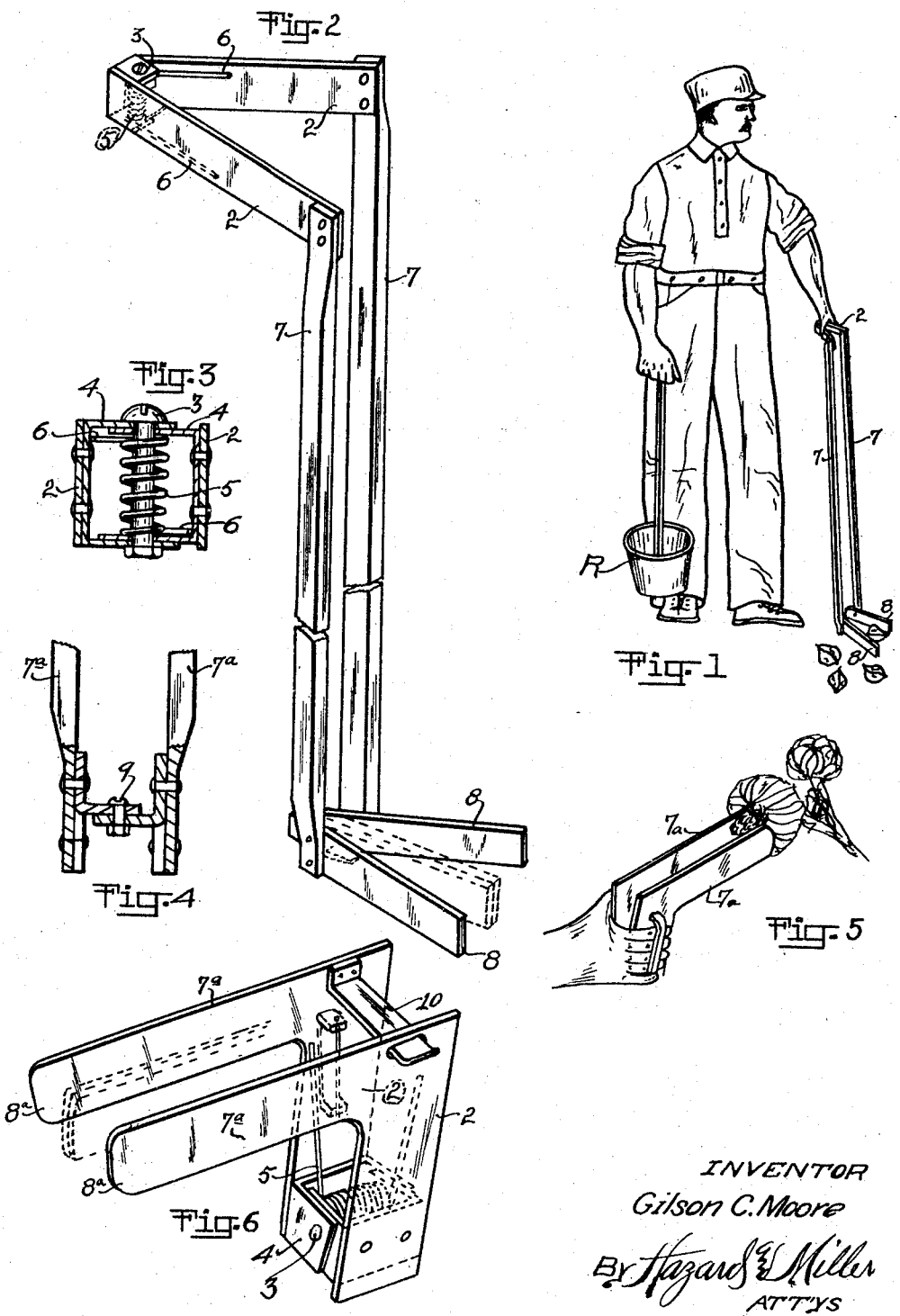

GILSON C. MOORE, OF LOS ANGELES, CALIFORNIA.

FRUIT-GATHERER.

1,364,399.  Specification of Letters Patent.  Patented Jan. 4, 1921.

Application filed October 27, 1919. Serial No. 333,698.

*To all whom it may concern:*

Be it known that I, GILSON C. MOORE, a citizen of the United States, residing at Los Angeles, in the county of Los Angeles and State of California, have invented new and useful Improvements in Fruit-Gatherers, of which the following is a specification.

This invention relates to a device for gathering various bodies, such as seed pods, fruit, and nuts that may have been shaken or fallen from a tree, and it is an object of the present invention to provide a device of this kind that is simple, durable, substantial and inexpensive and especially by which nuts or other bodies lying at the feet of the operator or user of the device can be colleted rapidly and disposed in a suitable receptacle without the necessity of his having to bend over to reach down to the surface on which he may be standing or toward the surface on which bodies to be picked up may be resting, and a further object is to provide a device of the kind that will enable the rapid and efficient picking of pods or any other bodies while still attached to trees or bushes.

The invention consists of the construction and details, forms of which are illustrated in the accompanying drawings and described and claimed herein.

Figure 1 is a view showing one form of the device as in use in picking up nuts that are lying on the ground.

Fig. 2 is a detail perspective view of the nut gathering form of the device with the parts in their normal or open position.

Fig. 3 is a cross sectional detail of the pivot structure of the handle members of Fig. 2.

Fig. 4 is a cross section in detail of the pivotal connection of the toe members of the structure in Fig. 1.

Fig. 5 is a perspective view showing the use of a modified form of the device for picking pods such as cotton bolls.

Fig. 6 is a perspective view showing clearly the construction of the device of Fig. 5.

In the form of the invention illustrated in Fig. 2, a pair of handle forming members 2—2 which may be made of inexpensive material such as strap iron are pivotally connected at one end on a pivot, as a bolt 3, passing through overlapped ears 4 formed on or attached to the adjacent ends of the members 2 so that these may readily swing to an open or closed position, and preferably the handle members 2 are automatically spread to an open angular position as in Fig. 2 by a suitable means shown as comprising a helical spring 5 mounted about the pivot bolt 3 and having divergent spring arms 6—6 reacting against the inside faces of the handle members 2—2.

In order to facilitate the ready gathering of the nuts or other bodies that may be lying upon a surface not within convenient reach of the user of the device unless he bends over, the front ends of the members 2—2 are provided with extensions 7—7 in Fig. 2 shown as rods rigidly connected to the outer ends of the members 2—2, and on the lower ends of the extensions or rods 7—7 are formed or provided with toe portions indicated at 8—8.

These toe portions are pivotally connected together as at 9, Fig. 4, at their adjacent ends just behind the intersection or joint therewith of the lower ends of the rods 7 while the opposite or free ends of the toe forming portions 8—8 extend a suitable distance and are normally swung to the open position shown in Fig. 2 through means of the spreading tendency of the rods 7—7 and the handle members 2—2.

In the use of the form of the device shown in Fig. 2 the operator grasps the yielding handle members 2—2 in one hand and by closing the grip of the hand on these members causes them to move together and at the same time closes the toe portions 8—8 to engage therebetween the fallen nuts or other bodies that are to be picked up. As shown in Fig. 1 the nuts as they are gathered by the device may be readily lifted and placed into any suitable receptacle R that may be carried by the user.

Fig. 6 shows in detail a slightly modified form of the gathering device in which the handles 2—2 are similarly pivoted and provided with a spring 5 operative to normally open the handles which may be limited in their opening movement, if preferred, by any suitable form of stop as a stop bar 10 attached to one or the other of the movable parts and engageable with the other member to limit its outward movement.

In this form of the invention the extension members 7ᵃ are of less length than the extension rods 7 of Fig. 2, and their ends or toe forming portions 8ª are designed to be brought into gripping contact with the articles or bodies to be collected as shown in Fig. 5 upon the closing movement of the members 7ª of the device. The modification as shown in Figs. 5 and 6 is especially suitable for picking cotton and the like.

Various changes may be made without departing from the spirit of my invention as claimed.

I claim:

In a device for gathering fruit and the like, the combination of a pair of handle members pivoted upon each other at their proximal ends and having spring means to normally hold their distal ends in spaced relation, a pair of extension rods secured to the distal ends of said handle members and extending at substantially right angles thereto, a pair of gripping toe members secured to the opposite ends of the extension and disposed at substantially right angles thereto, said toe members being hinged adjacent their inner ends, substantially as described.

In testimony whereof I have signed my name to this specification.

GILSON C. MOORE.